United States Patent
Rediehs (10) Patent No.: US 6,923,608 B2
(45) Date of Patent: Aug. 2, 2005

(54) TRAILER FOR SECURING AND HAULING STEEL COILS

(75) Inventor: William K. Rediehs, Palos, IL (US)

(73) Assignee: Redi-Built Trailers, LLC, Willowbrook, IL (US)

( * ) Notice: Subject to any disclaimer, the term of this patent is extended or adjusted under 35 U.S.C. 154(b) by 0 days.

(21) Appl. No.: 10/602,939

(22) Filed: Jun. 24, 2003

(65) Prior Publication Data

US 2004/0009050 A1 Jan. 15, 2004

Related U.S. Application Data

(60) Provisional application No. 60/391,485, filed on Jun. 25, 2002.

(51) Int. Cl.$^7$ .................................................. B60P 7/12
(52) U.S. Cl. ........................... 410/49; 410/42; 410/122
(58) Field of Search .............................. 410/49, 30, 31, 410/32, 36, 42, 44, 47, 50, 121, 122, 123

(56) References Cited

U.S. PATENT DOCUMENTS

| | | | | |
|---|---|---|---|---|
| 2,298,851 A | * | 10/1942 | Wachter | 410/44 |
| 2,810,602 A | * | 10/1957 | Abrams | 410/42 |
| 3,221,907 A | * | 12/1965 | O'Sullivan | 414/787 |
| 3,291,072 A | * | 12/1966 | Cunningham | 410/49 |
| 3,291,073 A | * | 12/1966 | James | 410/49 |
| 3,353,506 A | * | 11/1967 | Snyder et al. | 410/49 |
| 3,387,813 A | * | 6/1968 | Carino | 410/50 |
| 3,392,682 A | * | 7/1968 | Francis | 410/42 |
| 3,481,627 A | * | 12/1969 | Felburn | 410/50 |
| 3,922,004 A | * | 11/1975 | Chamberlain | 410/49 |
| 4,365,919 A | * | 12/1982 | Mehki | 410/120 |
| 4,451,188 A | * | 5/1984 | Smith et al. | 410/42 |
| 4,732,528 A | * | 3/1988 | Good | 414/802 |
| 5,170,717 A | | 12/1992 | Richmond et al. | |
| 5,211,518 A | | 5/1993 | Mimica | |
| 5,294,221 A | * | 3/1994 | Eller et al. | 410/30 |
| 5,336,027 A | | 8/1994 | Paddock | |
| 5,343,813 A | | 9/1994 | Septer | |
| 5,401,129 A | | 3/1995 | Eatinger | |
| 6,077,005 A | * | 6/2000 | Westlake | 410/49 |
| 6,190,100 B1 | * | 2/2001 | Mawji | 410/49 |
| 2002/0076292 A1 | * | 6/2002 | Al-Kaabi et al. | 410/47 |

FOREIGN PATENT DOCUMENTS

| | | | | |
|---|---|---|---|---|
| JP | 361291238 | * | 12/1986 | 410/49 |
| JP | 361291239 | * | 12/1986 | 410/49 |

* cited by examiner

Primary Examiner—H. Gutman
(74) Attorney, Agent, or Firm—Woodard, Emhardt, Moriarty, McNett & Henry LLP (57) ABSTRACT

A vehicular trailer for transporting cylindrical objects such as metal coils. The trailer includes front and rear deck portions and a middle deck portion positioned lower than and between the front and rear portions. Two or more chocks are pivotably secured to the trailer. The movable chocks and one or more straps secure a coil loaded on the middle deck portion for transport.

21 Claims, 13 Drawing Sheets

TRAILER FOR SECURING AND HAULING STEEL COILS

This application claims priority to and incorporates by reference U.S. Provisional application Ser. No. 60/391,485 filed Jun. 25, 2002.

FIELD OF THE INVENTION

The present invention relates generally to the field of transporting large metal coils and more particularly to an improved trailer and securing system for transporting metal coils.

BACKGROUND OF THE INVENTION

One aspect of the production of steel is the manufacture of long steel sheets. Traditionally these steel sheets are cut into long flats or wound into large coils weighing several tons. Prior to cutting and shaping into finished products, these steel sheets must be transported from the mills where they are produced to the manufacturing plants where they are processed. During at least a portion of this journey the steel is typically hauled using a truck tractor and trailer.

The shipping of steel and other metal coils by truck trailer presents several problems. In addition to weight and trailer load capacity considerations, particular attention must be paid to securing metal coils to the trailer to prevent shifting of the load during transport. This problem is particularly challenging for a coil weighing several tons and traveling at highway speeds. As coils by their very nature have rounded surfaces, they raise the additional hazard of rolling into traffic should they become unsecured from a moving trailer.

Figure 1:
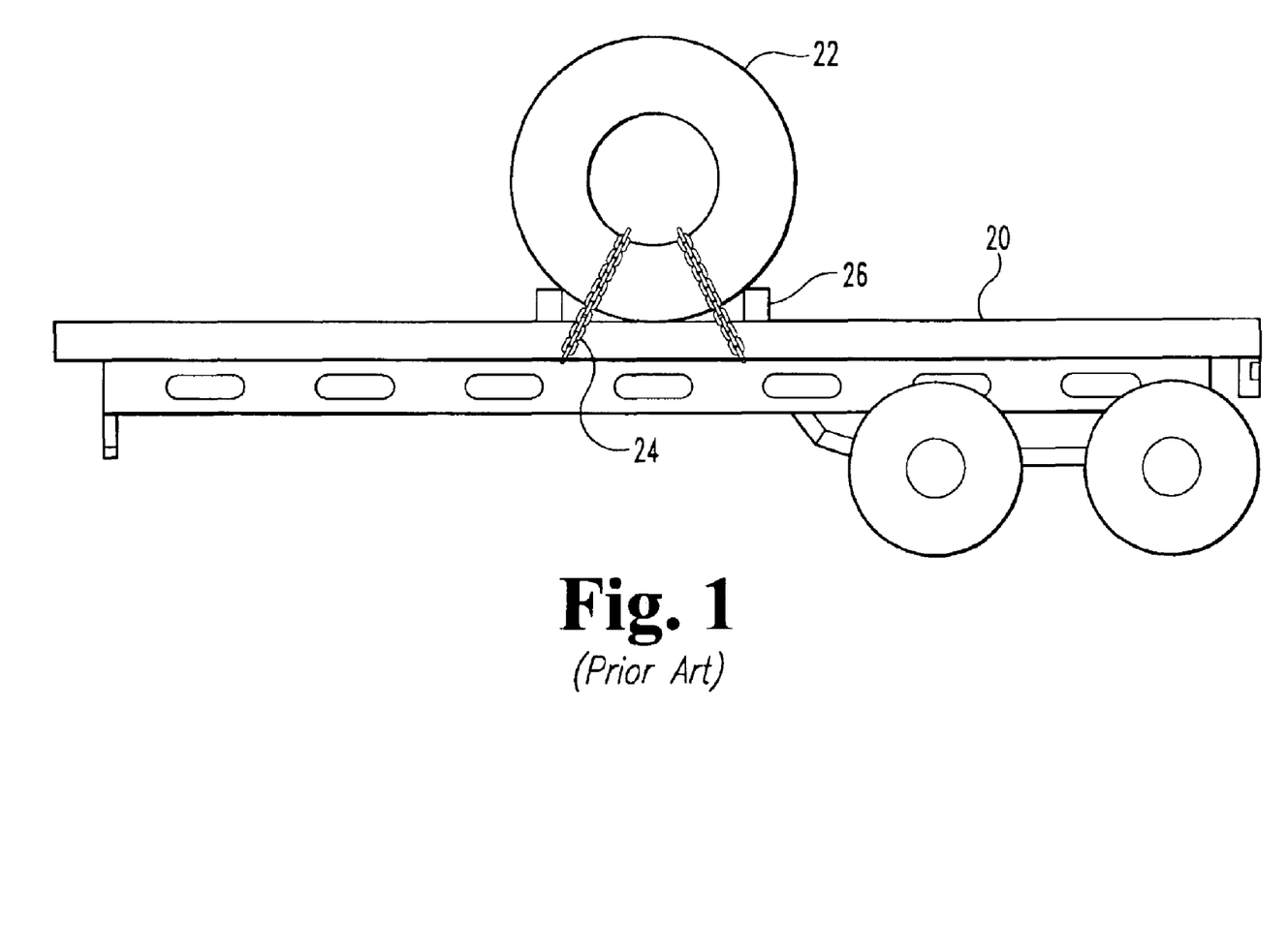
FIG. 1 is a side elevation view of a flatbed trailer for hauling metal coils as is known in the art.

Traditionally metal coils 22 have been secured to trailers 20 using a series of chains 24 and wooden blocks 26 arranged to prevent the coil from rolling. One such arrangement is shown in FIG. 1. In this particular arrangement, the axis of coil 22 is transverse to the direction of travel. Alternatively, the coil may be arranged on the trailer with the axis of the coil parallel to the direction of travel. Even if a coil is securely restrained on a trailer, particular care must be exercised to insure the coil is prevented from rocking on its rounded surface to prevent the build up of momentum in the multi-ton coil which might overtax the securing chains. In the event of chain failure in a traditional securing configuration, however, the coil is free to roll off of the trailer and onto the road or onto the tractor cab. Also, as coils have a high center of gravity relative to the trailer, large coils are capable of overturning a tractor and trailer without separating from the trailer during emergency maneuvers.

SUMMARY OF INVENTION

The invention is set forth in the claims below, and the following is not in any way to limit, define or otherwise establish the scope of legal protection. In general terms, the present invention relates to a vehicular trailer for transporting cylindrical objects such as metal coils. One embodiment of the present invention relates to a trailer having a front deck portion, a rear deck portion and a middle deck portion disposed between and at a distance below the front and rear deck portions. A first transitional wall disposed at an angle between the front and middle deck portions connects the front and middle deck portions. A second transitional wall disposed at an angle between the rear and middle deck portions connects the rear and middle deck portions. In certain embodiments, at least one chock is pivotably mounted to the first transitional wall and at least one chock is pivotably mounted to the second transitional wall. The chocks are movable between a first position and a second position.

Further objects, embodiments, forms, benefits, aspects, features and advantages of the present invention may be obtained from the description, drawings, and claims provided herein.

DESCRIPTION OF THE PREFERRED EMBODIMENTS

For the purposes of promoting understanding of the principles of the invention, reference will now be made to the embodiments illustrated in the drawings and specific language will be used to describe the same. It will nevertheless be understood that no limitation of the scope of the invention is hereby intended and alterations and modifications in the illustrated device, and further applications of the principles of the present invention as illustrated herein being contemplated as would normally occur to one skilled in the art to which the invention relates.

Figure 2:
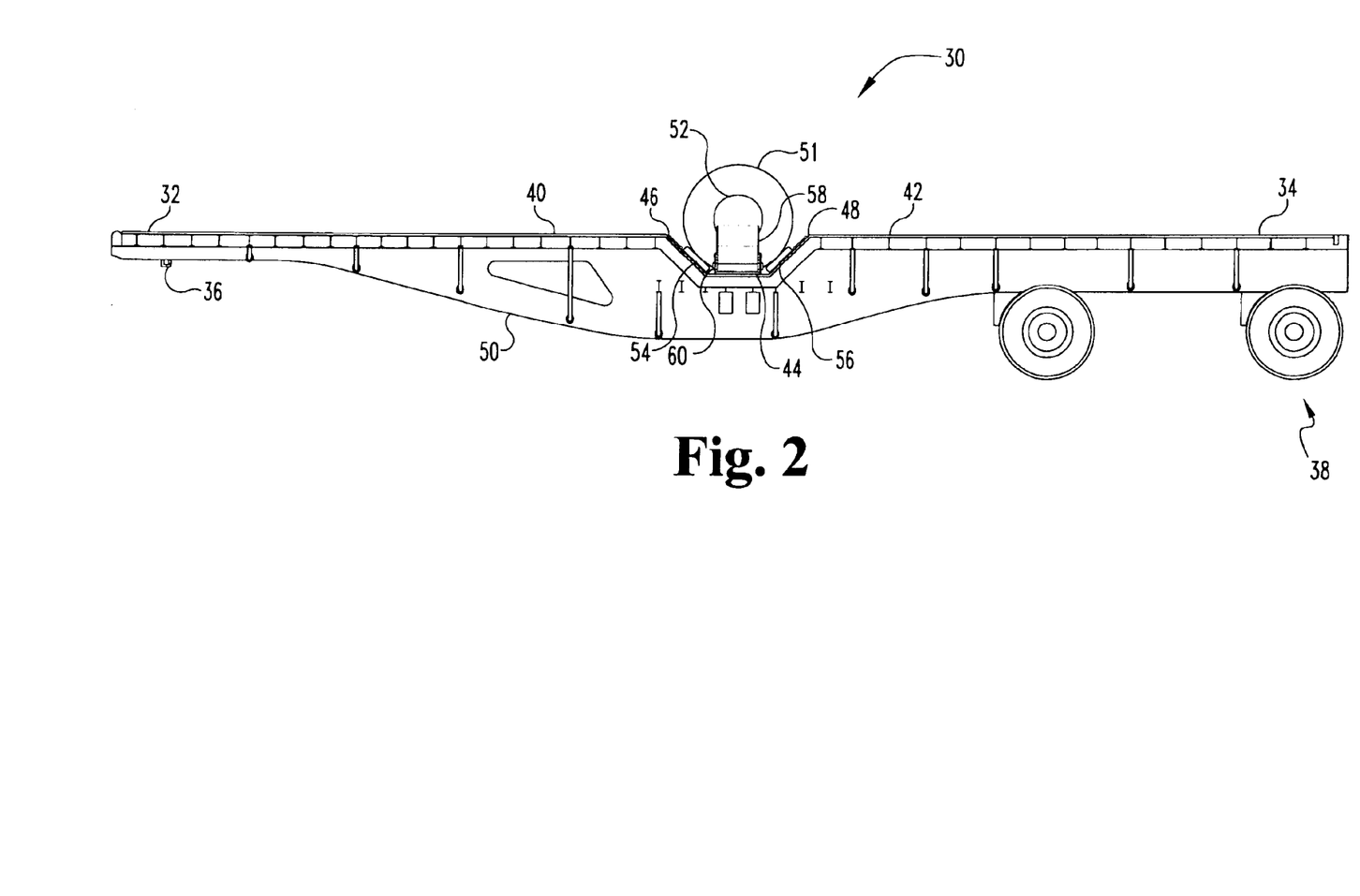
FIG. 2 is a side elevation view of a trailer for hauling metal coils according to one embodiment of the present invention.

FIG. 2 shows a side elevation view of a trailer 30 for hauling metal coils 51 having an axially located opening 52 or other cylindrical objects according to one embodiment of the present invention. Trailer 30 includes a front portion 32 and a rear portion 34. Front portion 32 includes an attachment apparatus 36 for attaching trailer 30 to the fifth wheel of a tractor truck as is known in the art and an upper deck portion 40. Rear portion 34 includes an upper deck portion 42 and a running gear indicated generally as 38, which includes conventional axles, wheels, brakes and related suspension equipment.

Trailer 30 further includes a middle or lower deck portion 44 between front deck 40 and rear deck 42 and at a distance below front deck 40 and rear deck 42. Middle deck 44, front deck 40 and rear deck 42 are generally flat, trapezoidal and parallel to one another. Front deck 40 and rear deck 42 are preferably coplanar. Located between front deck 40 and middle deck 44 is transitional wall 46. Transitional wall 46 is disposed at an angle between front deck 40 and middle deck 44. The size of this angle varies according to a particular application, but preferably is between 40 and 55 degrees. More preferably, this angle is approximately 45 degrees. Located between rear deck 42 and middle deck 44 is transitional wall 48. Transitional wall 48 is disposed at an angle between rear deck 42 and middle deck 44. The size of this angle is preferably approximately equal to the angle at which transitional wall 46 is disposed. Preferably, the surfaces of transitional walls 46 and 48 and middle deck 42 are covered with a protective material such as rubber, wood or other suitable material that will not damage the surface of metal coil 51. Trailer 30 further includes a frame indicated generally at 50 which supports front deck 40, middle deck 44, rear deck 42, transitional wall 46 and transitional wall 48. Frame 50 is preferably comprised of I-beam construction as is known in the art. The size and configuration of frame 50 varies according to the desired maximum load capacity of a particular trailer.

Figure 3:
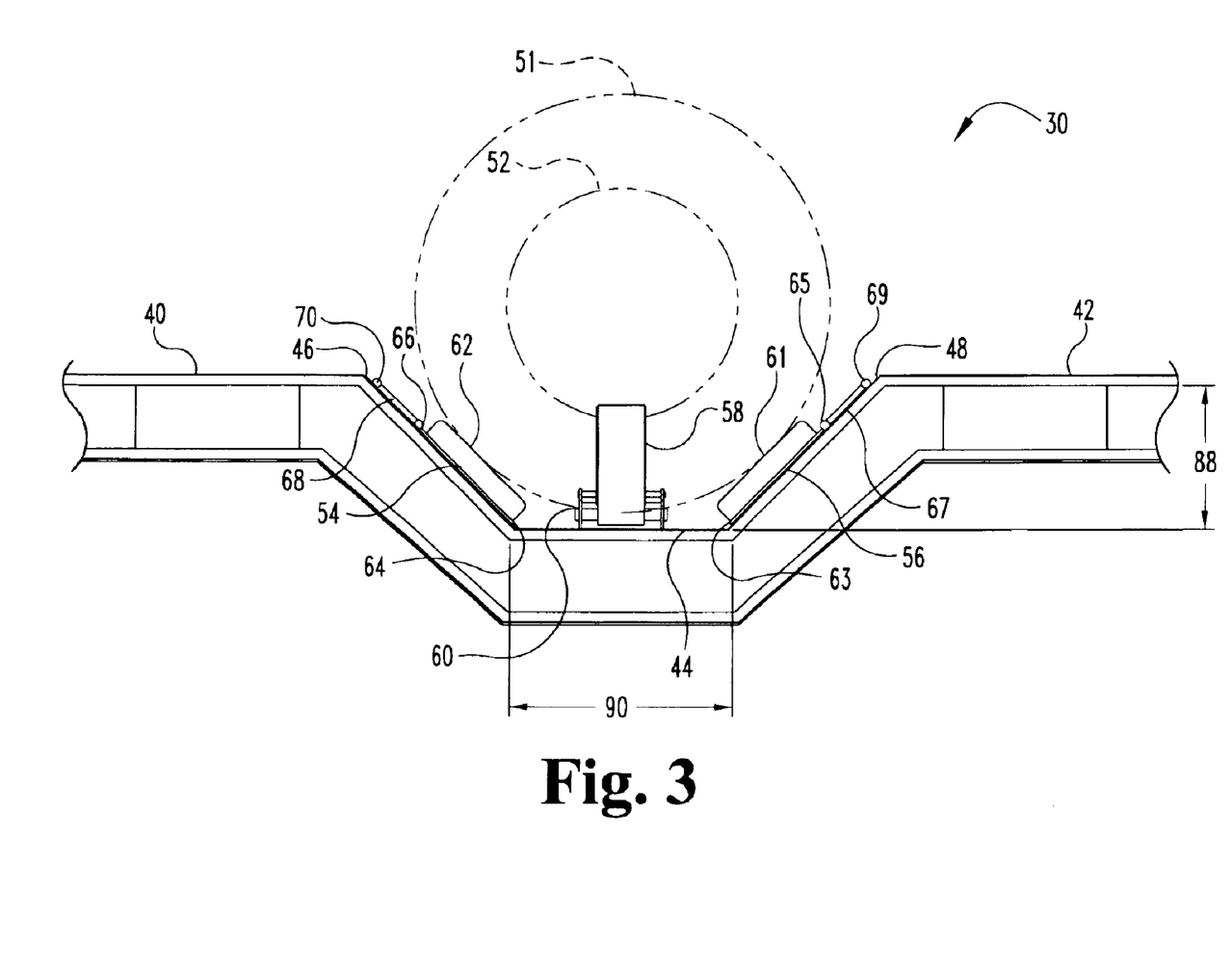
FIG. 3 is a detail view of a portion of the trailer shown in FIG. 2.
Figure 13:
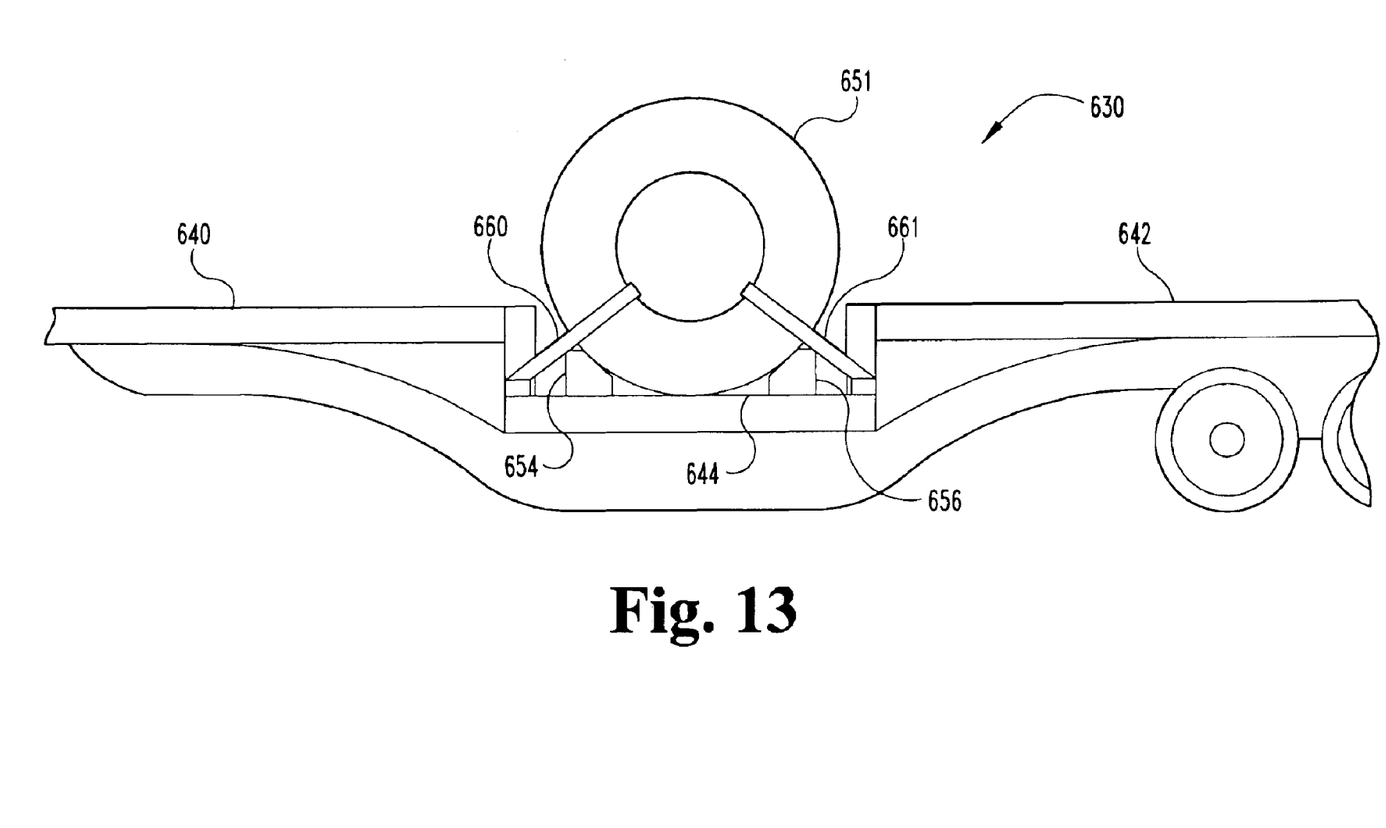
FIG. 13 is a side elevation view of a portion of a trailer for hauling metal coils according to still another embodiment of the present invention.

FIG. 3 is a detailed view of a portion of trailer 30 shown in FIG. 2. Trailer 30 further includes means for securing coil 51 such as a coil strap 58 having two ends and a strap tightening apparatus 60. In this particular embodiment, strap tightening apparatus 60 is a ratcheting cylinder fixed to a portion of middle deck 44. Optionally, strap tightening apparatus 60 is fixed to frame 50. Strap 58 is preferably retractably engaged at one end to tightening apparatus 60 and fixable at the other end to middle deck 44 or, alternatively, to frame 50. Fixation of strap 58 is accomplished using hooks, clamps, a second ratcheting cylinder, or other suitable means. Preferably strap 58 is approximately 12 inches wide and made of a woven material which meets or exceeds National Transportation and Safety Board standards. Other coil fixation methods such as chains or multiple coil straps as shown in FIG. 13 are also contemplated by the present invention as will be described in greater detail below.

Middle deck 44 is located at a distance 88 below front deck 40 and rear deck 42. Distance 88 varies according to the particular application, but in one embodiment is preferably between 18 and 22 inches. Middle deck 44 is supported by at least one, but preferably two, joist beams. These joist beams are preferably of the I-beam or box-beam design as is known in the art. Middle deck 44 is further supported by a plurality of cross beams which are generally perpendicular to the joist beams.

As seen in FIG. 3, a significant portion of coil 51 or other cylindrical load placed on middle deck 44 is located below front deck 40 and rear deck 42. Lowering the load relative to front deck 40 and rear deck 42 lowers the center of gravity of the loaded trailer. Lowering the trailer's center of gravity increases the stability of the load and decreases the chances of losing the load or overturning the tractor trailer unit during sudden maneuvers or accidents.

Trailer 30 further includes at least two coil chocks 54 and 56. In one embodiment of the present invention, coil chock 54 includes a back portion 64 having a cushion or bumper 62, at least one hinge 66, at least one arm portion 68 having a first end 101 and a second end 100, and at least one hinge 70. Hinge 66 is fixably mounted to back portion 64 and pivotably mounted to first end 101 of arm portion 68. Hinge 70 is fixably mounted to transitional wall 46 and pivotably mounted to second end 100 of arm portion 68. In an alternative embodiment, hinge 70 is fixably mounted to front deck 40 and pivotably mounted to second end 100 of arm portion 68. In yet another embodiment, chock 54 is fixably mounted to first end 101 of arm portion 68 and second end 100 of arm portion 68 is pivotably mounted to hinge 70. Hinge 70 is fixably mounted to transitional wall 46 or, alternatively, to front deck 40.

Coil chock 56 includes a back portion 63 having a cushion 61, at least one hinge 65, at least one arm portion 67 having a first end 102 and a second end 103, and at least one hinge 69. Hinge 65 is fixably mounted to back portion 63 and pivotably mounted to first end 102 of arm portion 67. Hinge 69 is fixably mounted to transitional wall 48 and pivotably mounted to second end 103 of arm portion 67. In an alternative embodiment, hinge 69 is fixably mounted to rear deck 42 and pivotably mounted to second end 103 of arm portion 67. In yet another embodiment, chock 56 is fixably mounted to first end 102 of arm portion 67 and second end 103 of arm portion 67 is pivotably mounted to hinge 69. Hinge 69 is fixably mounted to transitional wall 48 or, alternatively, to rear deck 42.

Figure 4:
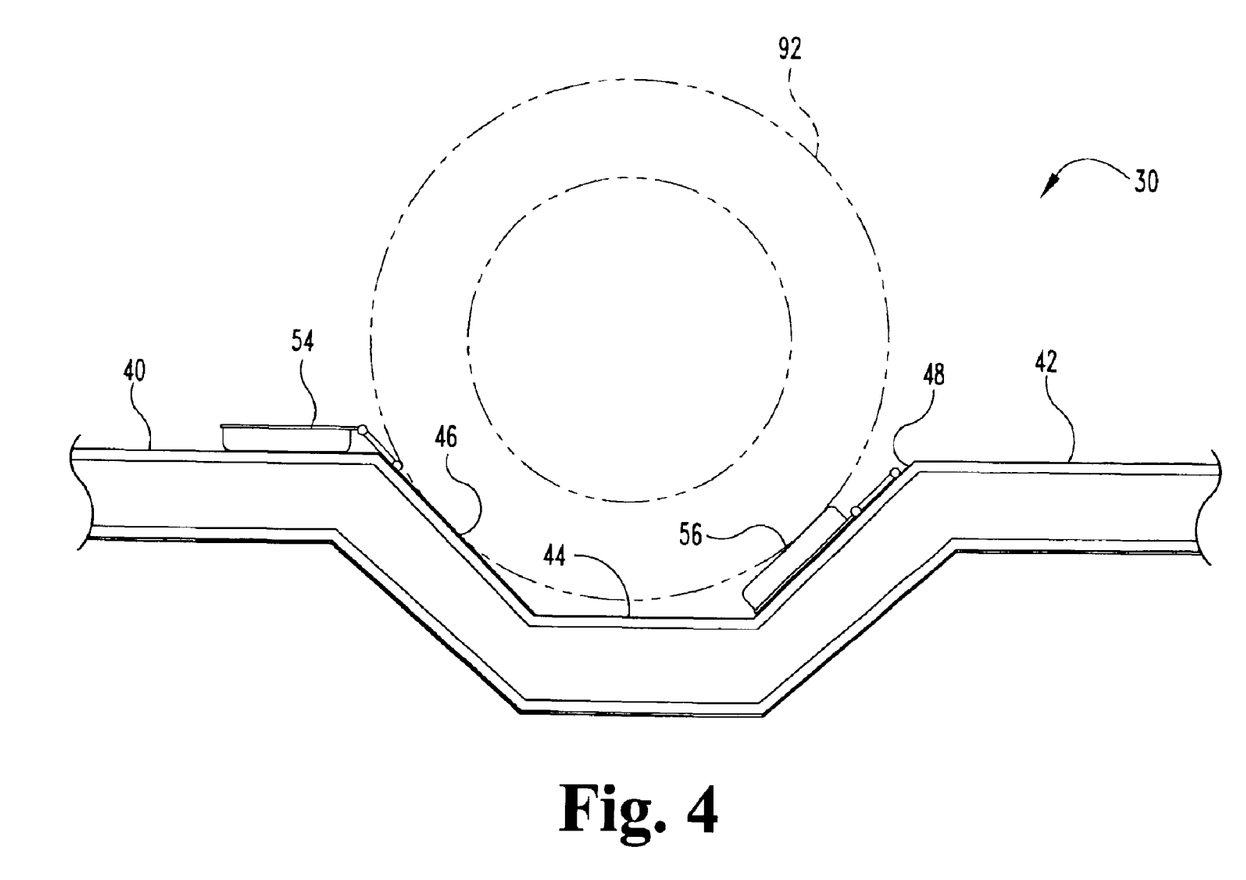
FIG. 4 is another detail view of a portion of the trailer shown in FIG. 2.
Figure 5:
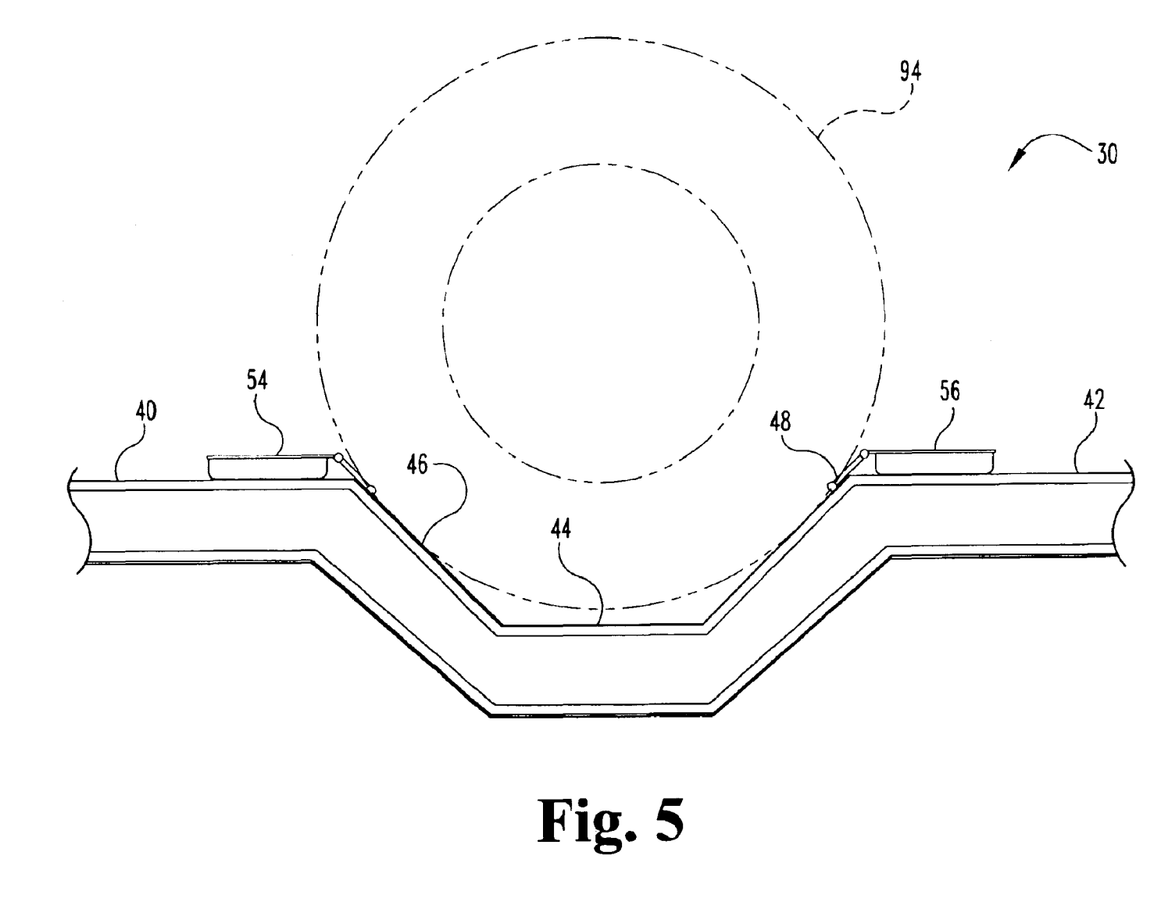
FIG. 5 is still another detail view of a portion of the trailer shown in FIG. 2.

Preferably, cushions 61 and 62 are made from hard rubber, plastic, wood or some other suitable material that will not scratch or otherwise damage coil 51 and which increases frictional forces between chocks 54 and 56 and coil 51 to prevent coil 51 from rotating during transport. Also preferably, cushions 61 and 62 are made of a material which resists compression to reduce lateral movement of coil 51 during transport caused by movement of trailer 30. Chocks 54 and 56 are movable between a first, lowered position (FIG. 3) and a second, stowed position (FIGS. 4 and 5). Optionally, chocks 54 and 56 further include a locking apparatus (not shown) capable of locking the chock in either the lowered or stowed position as desired.

The length 90 of middle deck 44 and the size of chocks 54 and 56 are selected so as to allow trailer 30 to transport a variety of coil sizes by using zero, one or two chocks 54 and 56 in the lowered position to secure the coil. For example, in one particular embodiment middle deck 44 and chocks 54 and 56 are sized and arranged such that when both chocks 54 and 56 are in the lowered position (FIG. 3), a coil 51 having an outer diameter of forty-eight (48) inches loaded on trailer 30 is secured by both chocks 54 and 56. Preferably, coil 51 does not contact middle deck 44 when loaded on trailer 30. Further, when chock 54 is in the stowed position and chock 56 is in the lowered position (FIG. 4), a coil 92 having an outer diameter of sixty (60) inches is secured by chock 56 and transitional wall 46 when loaded on trailer 30. Preferably, coil 92 does not contact middle deck 44 when loaded on trailer 30. Continuing with the present example, a coil 94 having an outer diameter of seventy-two (72) inches is secured by transitional walls 46 and 48 when loaded on trailer 30 when chocks 54 and 56 are in the stowed position. (FIG. 5). Preferably, coil 94 does not contact middle deck 44 when loaded on trailer 30. In alternative embodiments of the present invention, middle deck 44 and chocks 54 and 56 are sized and configured to accommodate coils or other cylindrical objects having different outer diameters when using zero, one or two chocks in the lowered position.

Figure 6:
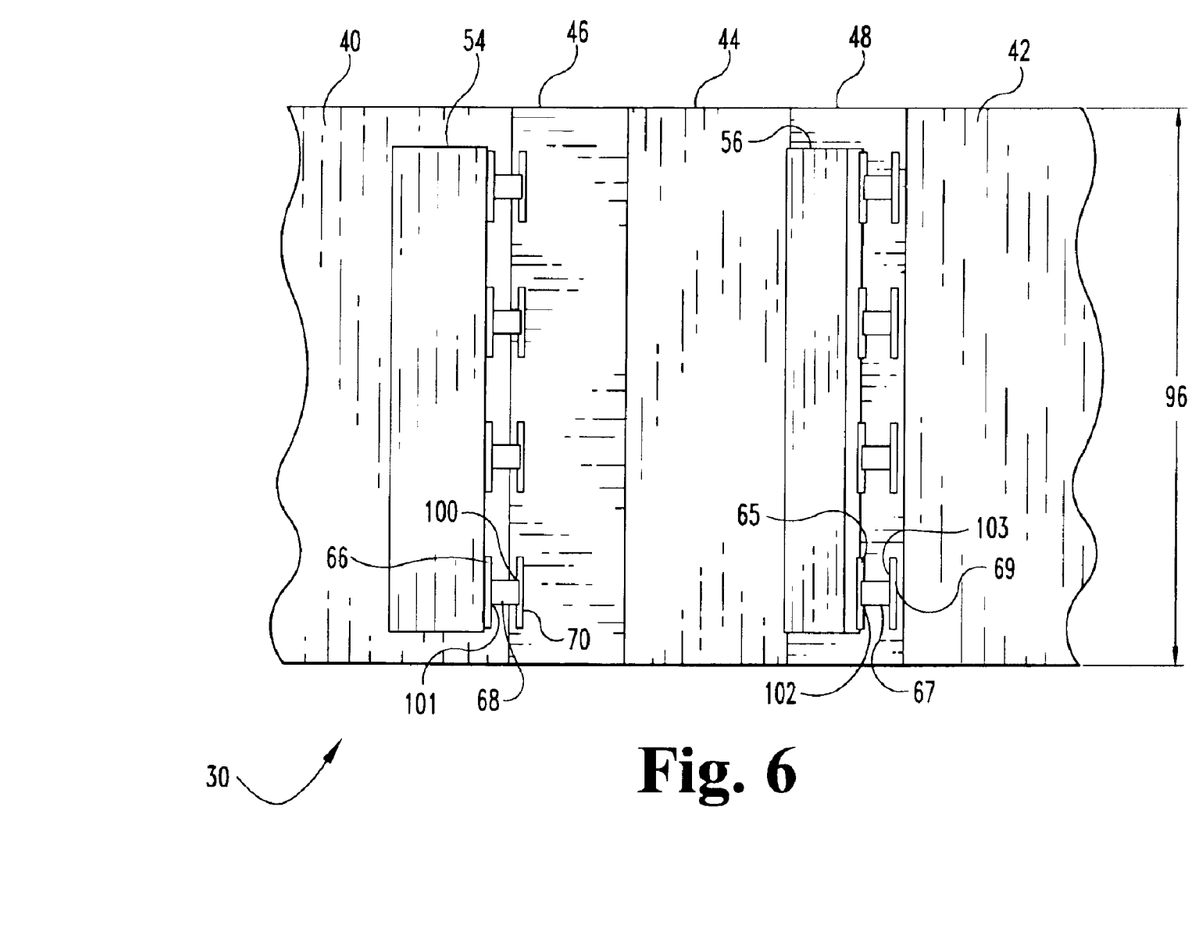
FIG. 6 is a detail plan view of a portion of the trailer shown in FIG. 2.

FIG. 6 shows a detail plan view of a portion of trailer 30 shown in FIG. 4. In this particular view, objects such as coil 51 have been omitted for the sake of clarity. As seen in this view, trailer 30 has a width indicated as 96. Preferably, width 96 is the standard trailer width of 96 inches, although trailers of other widths are also contemplated by the present invention. Chock 54 is shown in the stowed position and chock 56 is shown in the lowered position. In this particular embodiment, chock 54 includes four hinges 66 pivotably mounted to four arm portions 68 which are pivotably mounted to four hinges 70 which are fixed to transitional wall 46. In alternative embodiments, chock 54 includes a greater or lesser number of hinges and arm portions.

Figure 7:
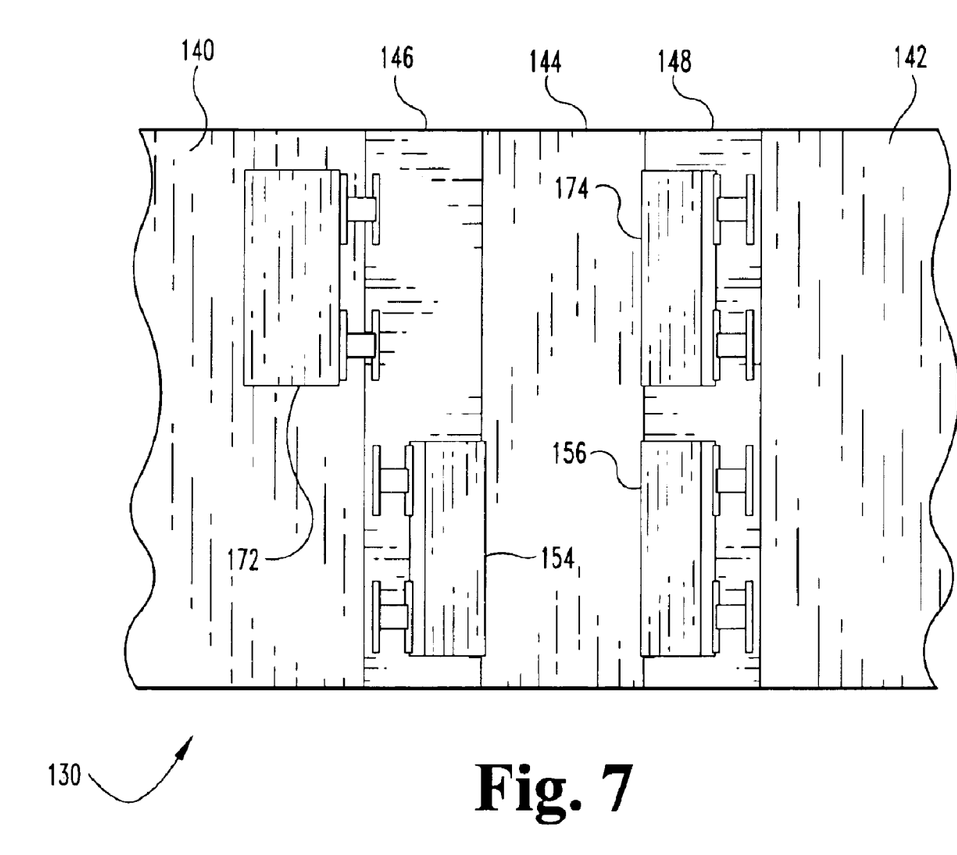
FIG. 7 is a detail plan view of a portion of a trailer for hauling metal coils according to another embodiment of the present invention.

An alternative embodiment of a trailer 130 is shown in FIG. 7. In this particular embodiment, trailer 130 includes a front deck 140, a rear deck 142 and a middle deck 144. Front deck 140 and middle deck 144 are connected by transitional wall 146 and rear deck 142 and middle deck 144 are connected by transitional wall 148. Trailer 130 further includes four coil chocks 154, 156, 172 and 174. Chocks 154 and 172 are pivotably mounted to transitional wall 146. Chocks 156 and 174 are pivotably mounted to transitional wall 148. In this particular view, chock 172 is shown in the stowed position and chocks 154, 156 and 174 are shown in the lowered position. Alternative embodiments having a greater number of chocks or having different numbers of chocks attached to each transitional wall are also contemplated by the present invention.

Figure 8:
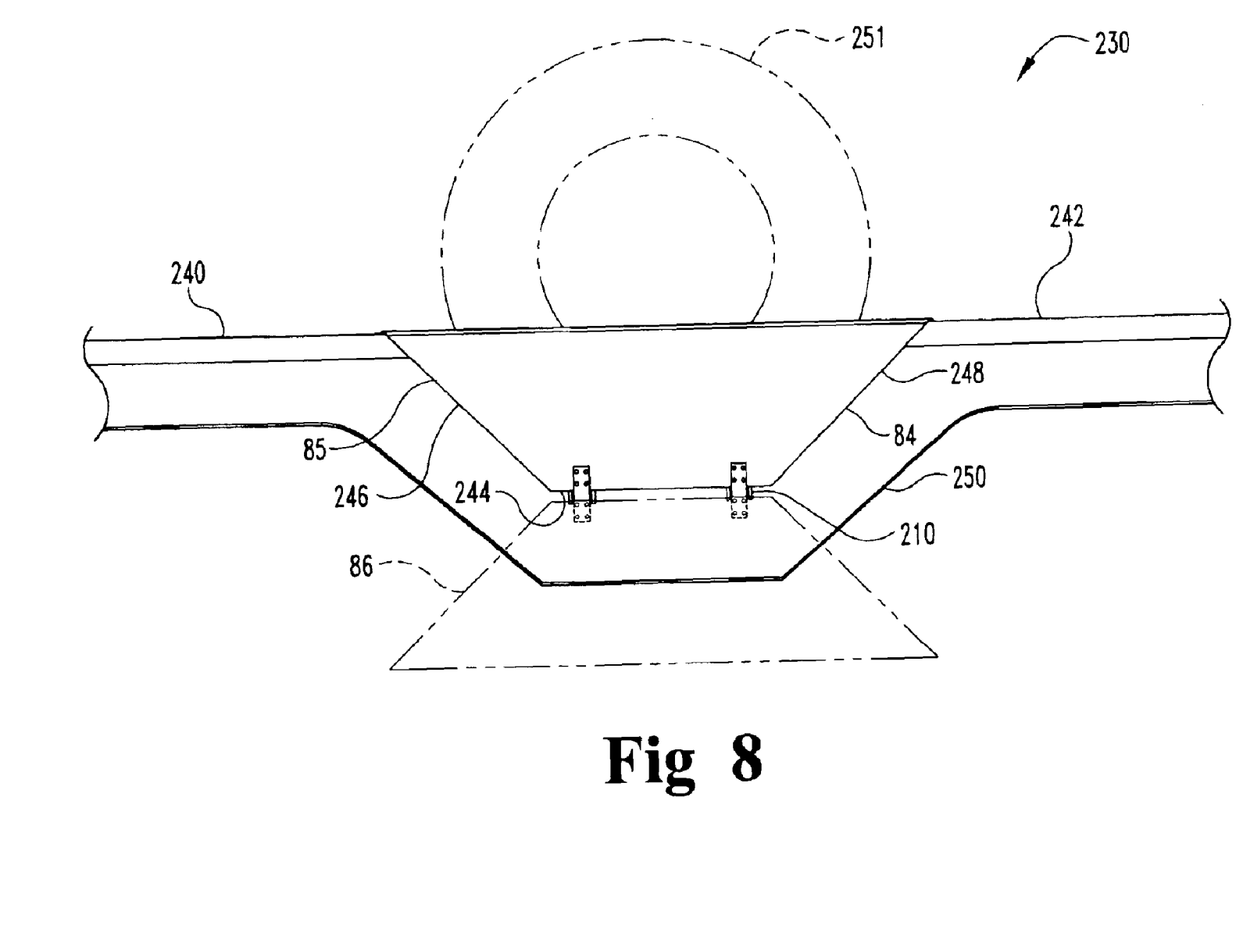
FIG. 8 is a detail view of a portion of a trailer for hauling metal coils according to yet another embodiment of the present invention.

Optionally, a trailer 230 according to the present invention includes one or more movable shields 84 to protect a coil 251 from the environment during transport as shown in FIG. 8. Trailer 230 includes a front deck 240, a rear deck 242 and a middle deck 244 supported by a frame 250. Front deck 240 and middle deck 244 are connected by a transitional wall 246 and rear deck 242 and middle deck 244 are connected by a transitional wall 248. Shield 84 such as is generally known in the art is hingably mounted to frame 250 by one or more hinges 210 and is movable between a raised position 85 and a lowered position 86 (shown in outline). Preferably, shield 84 further includes one or more locking apparatuses (not shown) for securing shield 84 in the raised position 85. Shield 84 protects the chocks and the coil or other object being hauled from dirt, water, road salt and other environmental factors. The portion of coil 251 that extends above shield 84 may be covered by a tarpaulin, a plywood housing or other suitable means to provide additional protection.

To secure a steel coil to trailer 30 according to the present invention, coil chocks 54 and 56 are positioned appropriately in the either the stowed or lowered position to accommodate the coil to be hauled. In this particular example shown in FIG. 2, both chocks 54 and 56 are in the lowered position to accommodate coil 51. Coil 51 is then placed on chocks 54 and 56 using a crane, lift truck, or other appropriate means. Preferably, coil 51 does not contact middle deck 44 when properly positioned on trailer 30. Once coil 51 is in position, strap 58 is placed through opening 52 in the center of coil 51 and secured to trailer 30 using a hook, clasp, clamp or other suitable means. Strap 58 is tightened using coil tightening device 60. Strap 58 prevents coil 51 from shifting from side to side on trailer 30 during transport. Friction between coil 51 and cushions 61 and 62 prevent coil 51 from rotating on trailer 30 during transport. Once coil 51 is positioned and secured, trailer 30 is transported using a standard tractor. Optionally, coil 51 may first be covered to protect it from the environment during transport.

Figure 9:
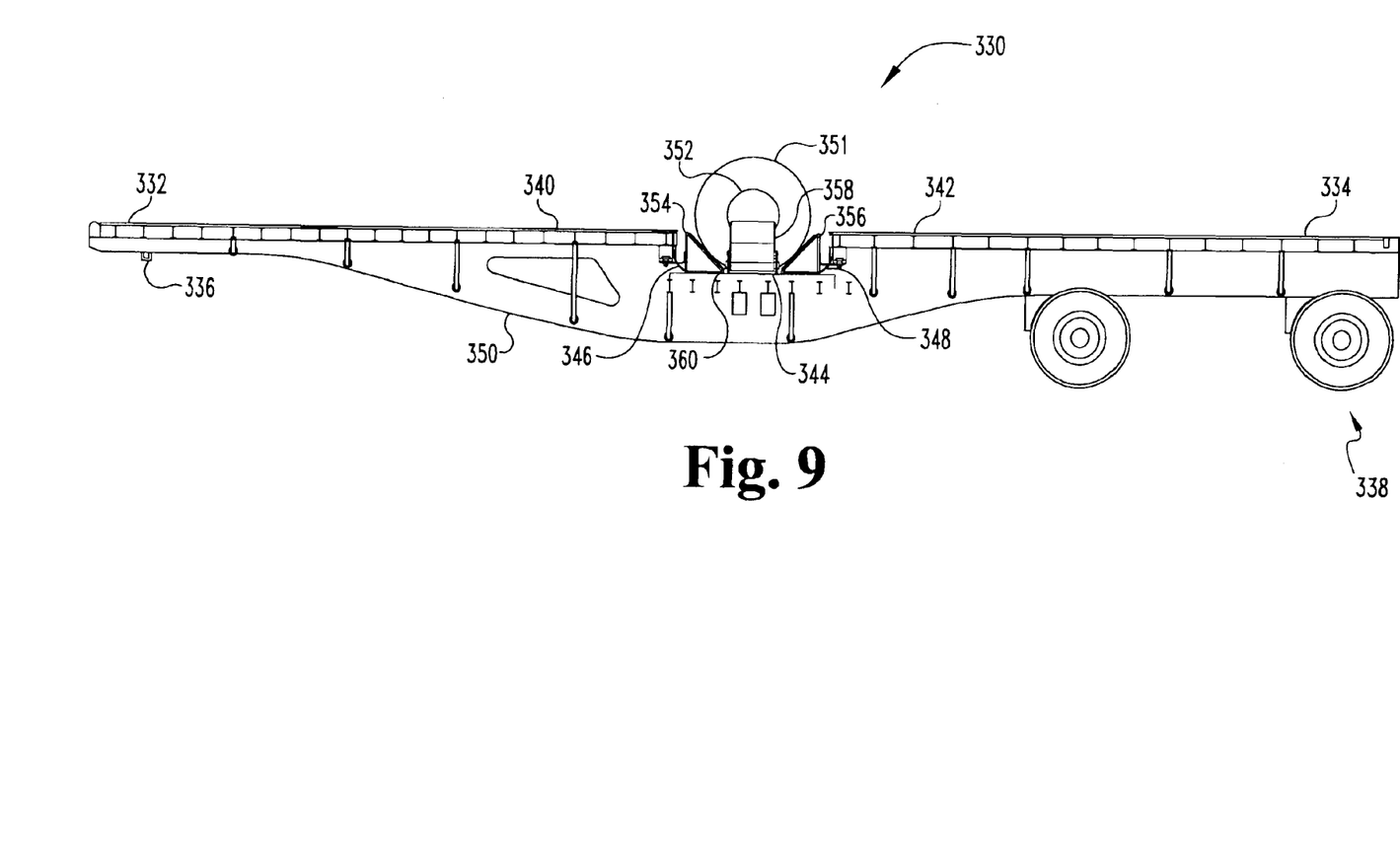
FIG. 9 is a side elevation view of a trailer for hauling metal coils according to still another embodiment of the present invention.

FIG. 9 shows a side elevation view of a trailer 330 for hauling metal coils 351 having an axially located opening 352 or other cylindrical objects according to another embodiment of the present invention. Trailer 330 includes a front portion 332 and a rear portion 334. Front portion 332 includes an attachment apparatus 336 for attaching trailer 330 to the fifth wheel of a tractor truck as is known in the art and an upper deck portion 340. Rear portion 334 includes an upper deck portion 342 and a running gear indicated generally as 338, which includes conventional axles, wheels, brakes and related suspension equipment.

Trailer 330 further includes a middle deck portion 344 between and below front deck 340 and rear deck 342. Middle deck 344, front deck 340 and rear deck 342 are generally flat, trapezoidal and parallel to one another. Front deck 340 and rear deck 342 are preferably coplanar. Optionally, transitional wall 346 is located between front deck 340 and middle deck 344 and transitional wall 348 is located between rear deck 342 and middle deck 344. Preferably, transitional walls 346 and 348 are substantially perpendicular to front deck 340 and rear deck 342, respectively. Preferably, middle deck 42 is covered with rubber, wood or other suitable material that will not damage the surface of a metal coil. Trailer 330 further includes a frame indicated generally at 350 which supports front deck 340, middle deck 344 and rear deck 342. Frame 350 is preferably comprised of I-beam construction as is known in the art. The size and configuration of frame 350 varies according to the desired maximum load capacity of a particular trailer.

Figure 10:
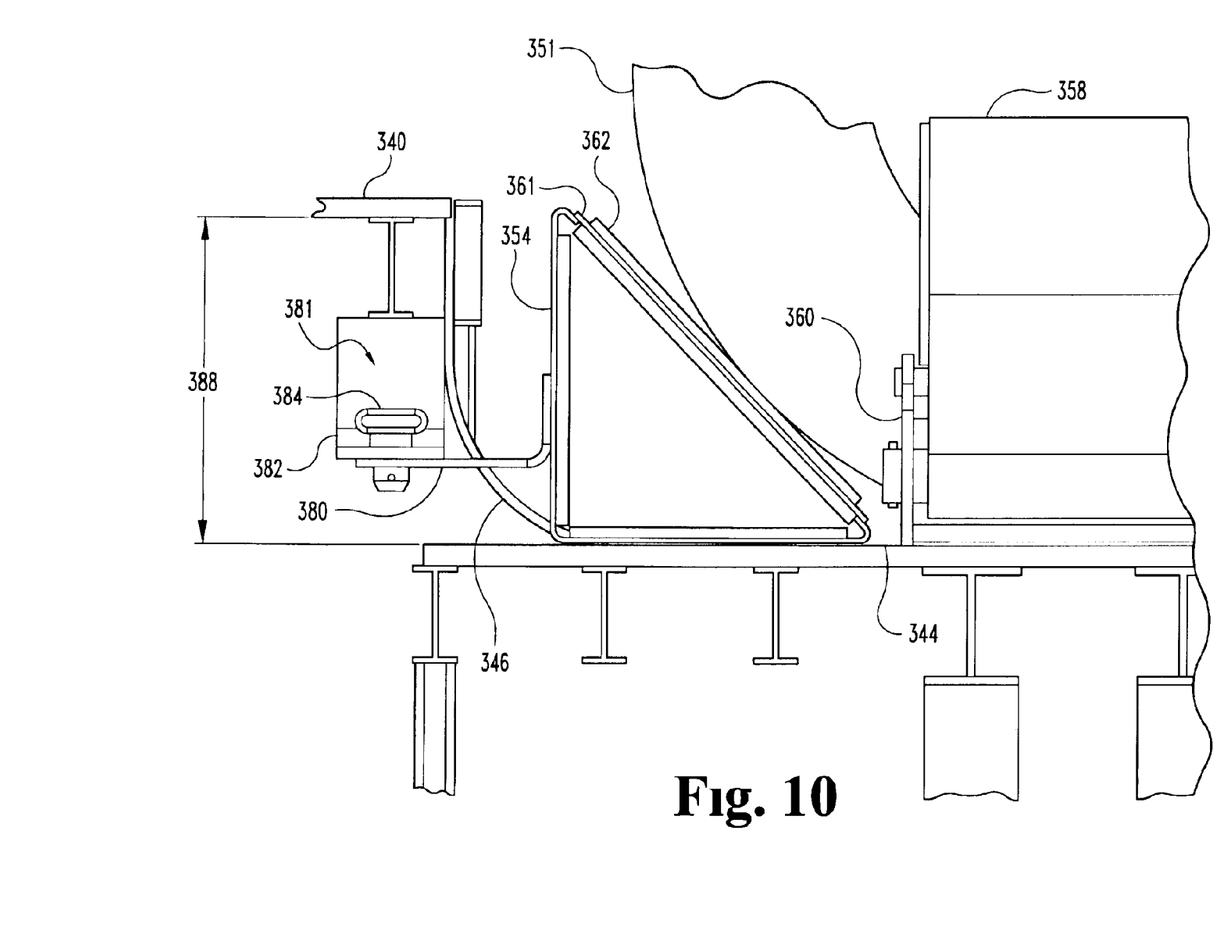
FIG. 10 is a detail view of a portion of the trailer shown in FIG. 9.

FIG. 10 is a detailed view of a portion of trailer 330 shown in FIG. 9. Trailer 330 further includes means for securing coil 351 such as a coil strap 358 having two ends and a strap tightening apparatus 360. Middle deck 344 is located at a distance 388 below front deck 340 and rear deck 342. Distance 388 varies according to the particular application, but in one embodiment is preferably between 18 and 22 inches. Middle deck 344 is supported by at least one, but preferably two, joist beams. These joist beams are preferably of the I-beam or box-beam design as is known in the art. Middle deck 344 is further supported by a plurality of cross beams which are generally perpendicular to the joist beams.

Trailer 330 further includes at least two coil chocks 354 and 356. In one embodiment of the present invention, coil chock 354 includes a face portion 361 having a cushion 362. Preferably, cushion 362 is made from a protective material such as hard rubber, plastic, wood or some other suitable material that will not scratch or otherwise damage coil 351 and which increases frictional forces between chock 354 and coil 351 to prevent coil 351 from rotating during transport. Chock 354 is movable between a plurality of positions on middle deck 344 to accommodate coils of various diameters. Preferably, chock 354 further includes a locking apparatus designated generally as 381 which locks chock 354 at the desired position on middle deck 344. In this particular embodiment, locking apparatus 381 includes a pin 384, an arm member 380 having a plurality of through holes sized so as to allow pin 384 to pass therethrough and a tab 382 having a through hole sized so as to allow pin 384 to pass therethrough. In this particular embodiment, tab 382 is fixed to trailer front portion 332. In other embodiments, tab 382 is fixed to middle deck 344. To secure the chock, chock 354 is moved to the desired position, preferably such that cushion 362 contacts coil 351. When chock 354 is in the desired position, pin 384 is inserted through the opening in tab 382 and through one of the plurality of openings in arm member 380, thereby locking tab 382 and arm member 380 and securing chock 354.

To secure a steel coil to trailer 330 according to the present invention, coil 351 is placed on chocks 354 and 356 using a crane, lift truck, or other appropriate means. Preferably, coil 351 does not contact middle deck 344 when loaded on trailer 330. Once coil 351 is in position, strap 358 is placed through opening 352 in the center of coil 351 and secured to trailer 330 using a hook, clasp, clamp or other suitable means. Strap 358 is tightened using coil tightening device 360. Strap 58 prevents coil 351 from shifting from side to side on trailer 330 during transport.

Once strap 358 is tightened, coil 351 is further secured by coil chocks 354 and 356. Preferably, at least one coil chock is positioned adjacent to each side of coil 351 near middle deck 344. Coil chocks 354 and 356 are preferably substantially the same length or longer than the width of coil 351. Alternatively, several shorter coil chocks may be used instead of a single long coil chock on each side of coil 351. Once positioned so that chock 354 contacts coil 351, chock 354 is secured to trailer 330 by inserting pin 384 through the opening in tab 382 and through one of the plurality of openings in arm member 380, thereby locking tab 382 and arm member 380 and securing chock 354. A similar procedure is performed to lock chock 356 into the desired position. Friction between coil 351 and chocks 354 and 356 prevent coil 351 from rotating on middle deck 344 during transport. Once coil 351 is positioned and secured, trailer 330 is transported using a standard tractor. Optionally, coil 351 may first be covered to protect it from the environment during transport.

Figure 11:
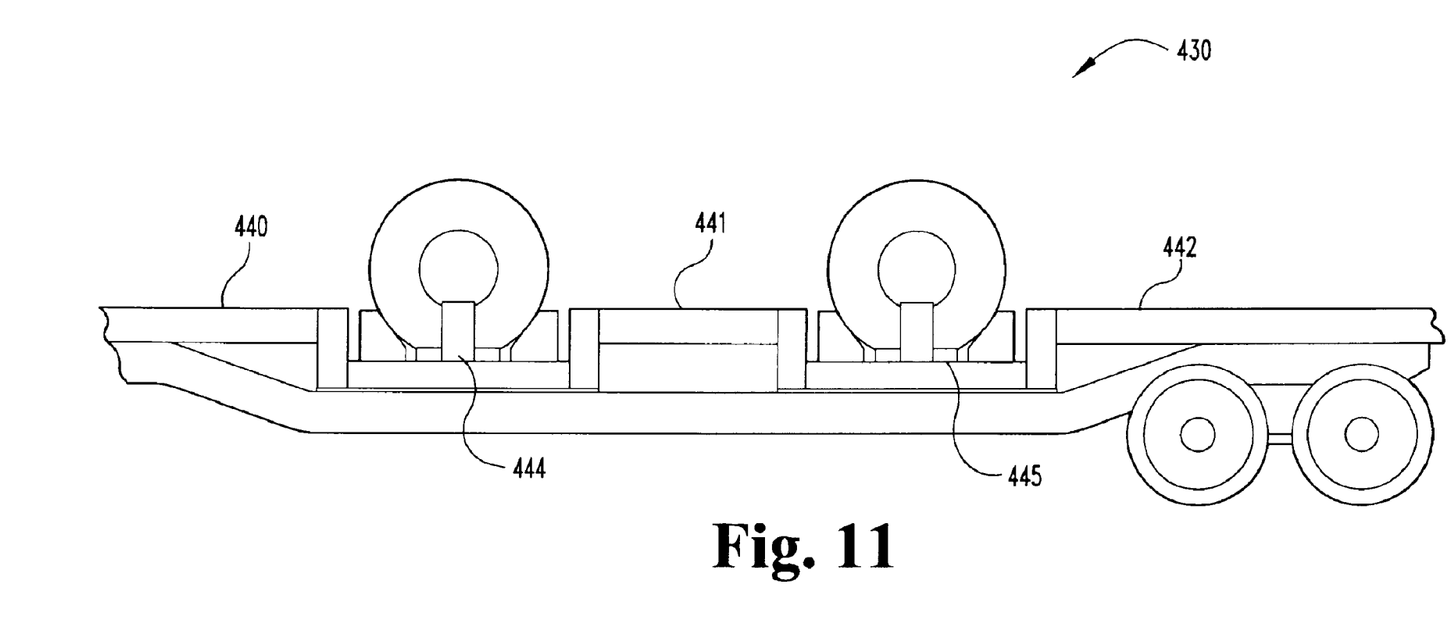
FIG. 11 is a side elevation view of a trailer for hauling metal coils according to another alternative embodiment of the present invention.
Figure 12:
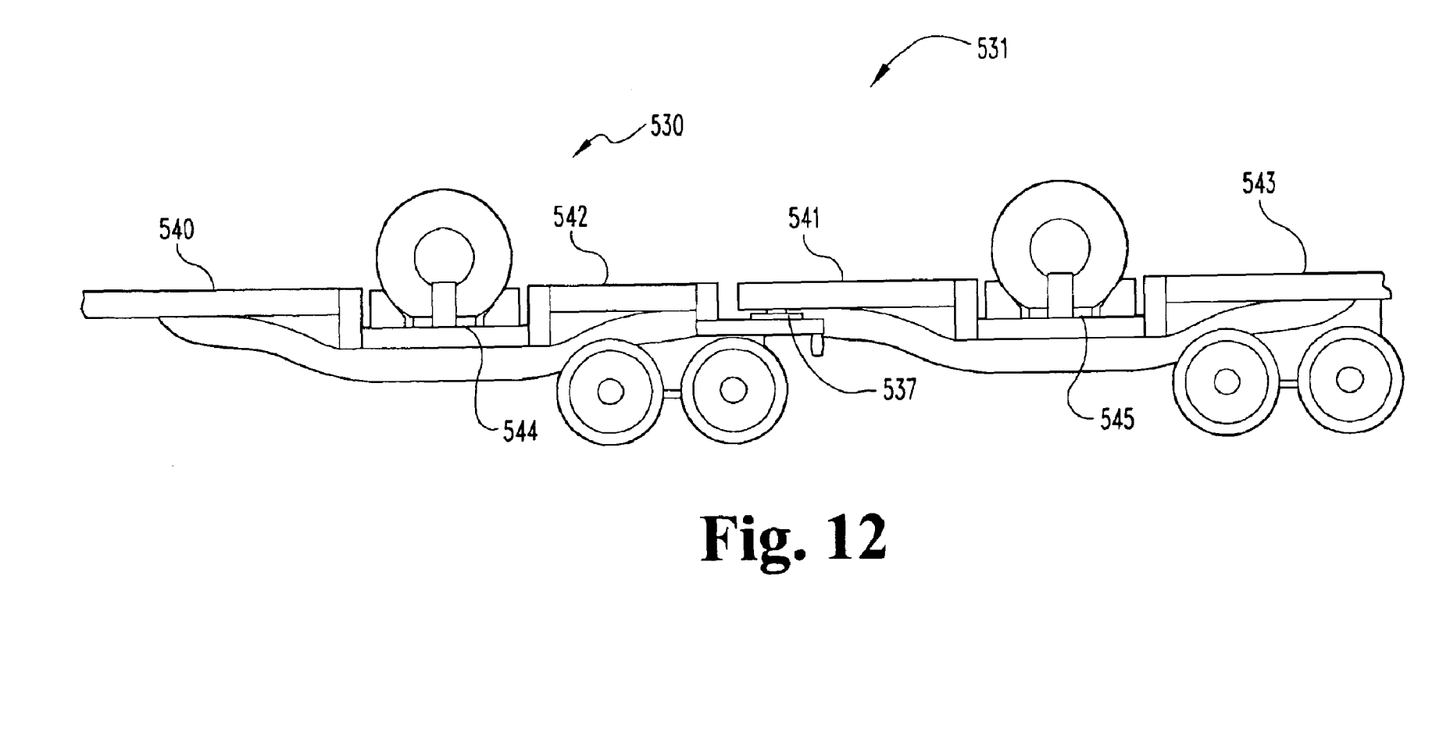
FIG. 12 is a side elevation view of a pair of trailers for hauling metal coils according to another embodiment of the present invention.

The present invention may also be used for securing metal coils to railroad cars and to oversized truck trailers such as those restricted to travel within a steel mill. The present invention also contemplates securing and hauling two coils simultaneously. One example of a two coil configuration is shown in FIG. 11. In this particular example, a single trailer 430 includes a front deck 440, a rear deck 442 and two middle decks 444 and 445 separated by a median deck 441. Another example of a two coil configuration is shown in FIG. 12. In this example, a first trailer 530 having a front deck 540, a rear deck 542 and a middle deck 544 is connected to a second trailer 531 having a front deck 541, a rear deck 543 and a middle deck 545. Trailer 530 also includes a fifth wheel type attachment point 537 allowing trailer 531 to be attached to trailer 530 in a lead trailer and "pup" trailer configuration as is known in the art.

FIG. 13 shows a detail view of a portion of a trailer 630 according to yet another embodiment of the present invention. Trailer 630 includes a front deck 640, a rear deck 642 and a middle deck 644. Coil 651 rests on middle deck 644 and is secured to trailer 630 by chocks 654 and 656 and coil straps 660 and 661. This is but one example of using multiple coil straps to secure coils according to the present invention.

While the invention has been illustrated and described in detail in the drawings and foregoing description, the same is to be considered as illustrative and not restrictive in character, it being understood that only the preferred embodiment has been shown and described and that all changes, modifications and equivalents that come within the spirit of the inventions disclosed are desired to be protected. The articles "a", "an", "said" and "the" are not limited to a singular element, and include one or more such elements.

What is claimed is:

1. A vehicular trailer for transporting cylindrical objects comprising:
   a front deck portion and a rear deck portion;
   a middle deck portion disposed between and at a distance below said front deck portion and said rear deck portion;
   a first transitional wall portion disposed at an angle between and connecting said front deck portion and said middle deck portion;
   a second transitional wall portion disposed at an angle between and connecting said rear deck portion and said middle deck portion;
   at least one front coil chock hingedly mounted to said first transitional wall portion and pivotable between a first position and a second position; and
   at least one rear coil chock hingedly mounted to said second transitional wall portion and pivotable between a first position and a second position.

2. The trailer of claim 1 wherein said first transitional wall portion is disposed at angle between 40 and 55 degrees between said front deck portion and said middle deck portion and said second transitional wall portion is disposed at angle between 40 and 55 degrees between said rear deck portion and said middle deck portion.

3. The trailer of claim 1 wherein said first transitional wall portion and said second transitional wall portion are covered with a protective material.

4. The trailer of claim 1 wherein said at least one front coil chock includes a cushioned portion.

5. The trailer of claim 4 wherein said cushioned portion is made of hard rubber.

6. The trailer of claim 1 wherein said at least one rear coil chock includes a cushioned portion.

7. The trailer of claim 6 wherein said cushioned portion is made of hard rubber.

8. The trailer of claim 1 wherein said at least one front coil chock contacts said first transitional wall portion when in said first position and said at least one rear coil chock contacts said second transitional wall portion when in said first position.

9. The trailer of claim 1 wherein said trailer further comprises a strap arranged to pass through an opening in a cylindrical object loaded on the trailer and retractably engaged with a strap tightening apparatus which is mounted to said middle deck portion.

10. The trailer of claim 1 wherein said front deck portion, said rear deck portion and said middle deck portion are substantially parallel.

11. A vehicular trailer for transporting cylindrical objects comprising:
    a front deck portion and a rear deck portion;
    a middle deck portion disposed between and at a distance below said front deck portion and said rear deck portion;
    a first transitional wall portion disposed at an angle between and connecting said front deck portion and said middle deck portion;
    a second transitional wall portion disposed at an angle between and connecting said rear deck portion and said middle deck portion;
    at least one front coil chock having a cushion portion; and
    at least one rear coil chock having a cushion portion;
    wherein said at least one front coil chock is hingably mounted to said first transitional wall portion and is movable between a support position and a stowed position;
    wherein said at least one rear coil chock is hingably mounted to said second transitional wall portion and is movable between a support position and a stowed position.

12. The trailer of claim 11 wherein said first transitional wall portion is disposed at angle between 40 and 55 degrees between said front deck portion and said middle deck portion and said second transitional wall portion is disposed at angle between 40 and 55 degrees between said rear deck portion and said middle deck portion.

13. The trailer of claim 12 wherein said first transitional wall portion and said second transitional wall portion are covered with a protective material.

14. The trailer of claim 12 wherein said cushion portion of said at least one front coil chock is made of hard rubber and said cushion portion of said at least one rear coil chock is made of hard rubber.

15. The trailer of claim 11 wherein said at least one front coil chock contacts said first transitional wall portion when in said support position and said at least one rear coil chock contacts said second transitional wall portion when in said support position.

16. The trailer of claim 11 wherein said trailer further comprises a strap arranged to pass through an opening in a cylindrical object loaded on the trailer and retractably engaged with a strap tightening apparatus which is mounted to said middle deck portion.

17. The trailer of claim 11 wherein said front deck portion, said rear deck portion and said middle deck portion are substantially parallel.

18. The trailer of claim 11 wherein said support positions for said front and rear chocks are defined with said front and rear chock disposed on said first or second transitional wall portion respectively, and wherein said stowed positions for said front and rear chocks are defined with said front or rear chocks disposed on said front or rear deck portions respectively.

19. The trailer of claim 16 wherein said strap tightening apparatus is a ratcheting cylinder mounted to said middle deck.

20. The trailer of claim 16 wherein said strap is made of a non-metallic material.

21. The trailer of claim 16 wherein said strap is made of a woven material.

* * * * *